United States Patent [19]

Hiraiwa et al.

[11] Patent Number: 4,584,892

[45] Date of Patent: Apr. 29, 1986

[54] MANUAL TRANSMISSION SYNCHRONIZER

[75] Inventors: Kazuyoshi Hiraiwa, Atsugi; Akio Kawaguchi, Sagamihara, both of Japan

[73] Assignee: Nissan Motor Co., Ltd., Yokohama, Japan

[21] Appl. No.: 445,680

[22] Filed: Nov. 30, 1982

[30] Foreign Application Priority Data

Mar. 25, 1982 [JP] Japan ............................. 57-48024

[51] Int. Cl.⁴ .............................................. F16H 3/38
[52] U.S. Cl. ................................... 74/339; 192/53 E; 192/53 F
[58] Field of Search .............. 74/339; 192/53 E, 53 F, 192/53 G

[56] References Cited

U.S. PATENT DOCUMENTS

| 2,391,268 | 12/1945 | Peterson et al. | 192/53 E |
|---|---|---|---|
| 3,078,975 | 2/1963 | Eaton | 74/339 |
| 3,695,403 | 10/1972 | Eastwood | 192/53 E |
| 4,238,012 | 12/1980 | Takiguchi et al. | 192/48.91 |
| 4,261,216 | 4/1981 | Braun | 74/339 |
| 4,294,338 | 10/1981 | Simmons | 74/339 X |
| 4,376,475 | 3/1983 | Janiszewski | 192/53 F |

FOREIGN PATENT DOCUMENTS

| 1555158 | 1/1971 | Fed. Rep. of Germany | 192/53 F |
|---|---|---|---|
| 844534 | 7/1939 | France | |
| 1181512 | 6/1959 | France | 192/53 F |
| 100428 | 7/1980 | Japan | 192/53 F |
| 56-156528 | 12/1981 | Japan | 74/339 |

Primary Examiner—William F. Pate, III
Assistant Examiner—Dwight G. Diehl
Attorney, Agent, or Firm—Schwartz, Jeffery, Schwaab, Mack, Blumenthal & Evans

[57] ABSTRACT

A single piece spring member which replaces the normal insert and spread spring ring arrangements, under the influence of the coupling sleeve moving toward a gear, biases the baulk ring against the gear to induce an initial stage of synchronization, until the coupling sleeve splines slip past the spring, whereafter engagement of chamfers on the coupling sleeve splines and with those on the teeth formed on the baulk ring, completes the synchronization and permits the coupling sleeve to move into engagement with teeth on the gear.

6 Claims, 14 Drawing Figures

MANUAL TRANSMISSION SYNCHRONIZER

BACKGROUND OF THE INVENTION

1. Field of the Invention

The present invention relates generally to a manual transmission synchronizer and more specifically to a "Warner" type synchronizer in which single springs replace the usual spread spring and insert arrangements.

2. Description of the Prior Art

In previously proposed "Warner" type synchronizer arrangements inserts have been used to apply pressure to the baulk ring as the coupling sleeve moves toward a given gear. This engages a "cone-clutch" arrangement and induces the gear and coupling sleeve to rotate at approximately the same rotational speed and thus facilitates smooth entry of the splines on the coupling sleeve between the teeth formed on the gear. However, with this arrangement one or more of the inserts 1 are, as shown in FIG. 1, apt to slip out of their normal position and interfere with the return movement of the coupling sleeve 2 away from the gear 3 with which it is selectively engaged.

A full and detailed description of the above disclosed arrangement may be found in "AUTO-MECHANICS" (second edition) by Herbert Ellinger (1977 by Prentice-Hall, Inc.) pages 337 to 339, which is hereby incorporated by reference.

SUMMARY OF THE INVENTION

It is an object of the present invention to eliminate the above drawback via the use of a single insert spring which provides the function of both of the spread spring and insert.

The spring characterizing the present invention firstly biases a baulk ring axially as the coupling sleeve moves from a home or neutral position toward a gear with which the gear is associated, to apply a bias which presses the frustro-conical surface of the baulk ring into contact with the cooperating frustro-conical surface provided on the gear. Further movement of the coupling sleeve then induces a distortion of the spring which allows the coupling sleeve to move with respect to the spring (viz., slip past), firstly to a position wherein it engages the gear teeth of the baulk ring and subsequently to a position wherein it engages those on the gear per se.

More specifically, the present invention takes the form of a manual transmission synchronizer having a synchro-hub, a baulk ring, a coupling sleeve, means defining an aperture in the synchro-hub, and a single piece spring which is disposed in the aperture, the spring being formed with sections engageable with the baulk ring and the coupling sleeve and which are arranged to bias the baulk ring into engagement with the gear as the coupling sleeve is moved toward said baulk ring.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 6:
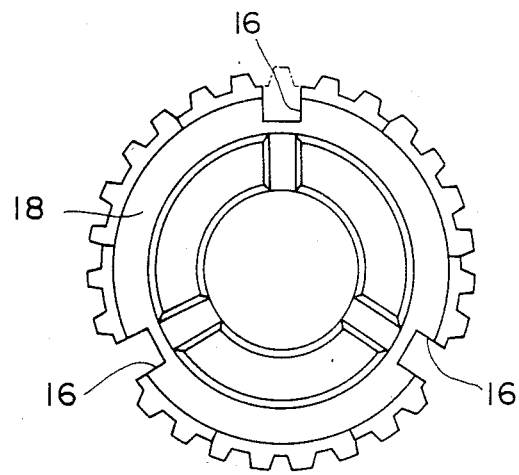
FIG. 6 is a elevational view of the sychro-hub shown in FIG. 5.

Turning now to FIGS. 2 to 5, a first embodiment of the present invention is shown. In this arrangement a spring 10 is formed of sheet spring steel so as to have an essentially "S" shaped cross-section and further formed with an outwardly and an inwardly curving flange 12, 14 at each end thereof. A plurality of these springs (in this embodiment three) are disposed in respective notches or recesses 16 formed in the synchro-hub 18 (see FIG. 6) and arranged so that the inwardly curving flanges 14 engage chamfers 20 formed on the ends of the coupling sleeve splines 22, when the coupling sleeve 24 assumes its home or neutral position, and the outwardly curving flanges 12 which are formed below or radially inward of the inwardly curving ones (14) engage the outer peripheral surface of the baulk rings 26, 27.

Figure 1:
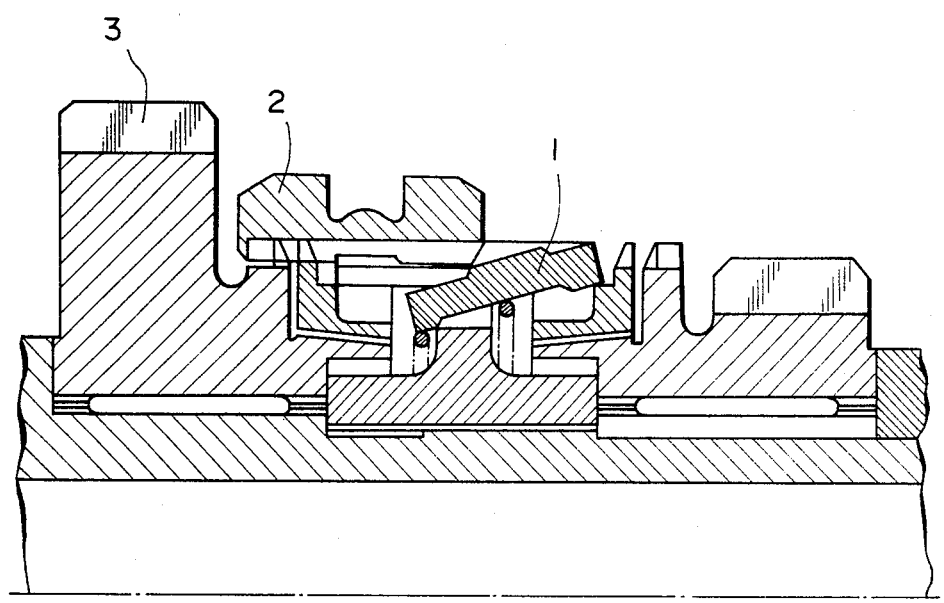
FIG. 1 is a sectional elevation of the prior art arrangement discussed briefly in the opening paragraphs of this disclosure.
Figure 2:
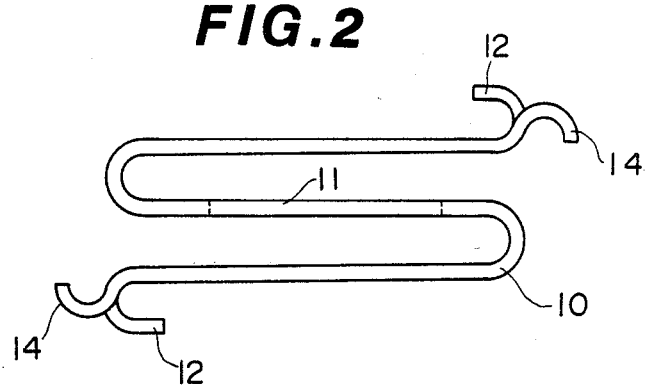
FIG. 2 is a plan view of a spring constituting a first embodiment of the present invention.
Figure 3:
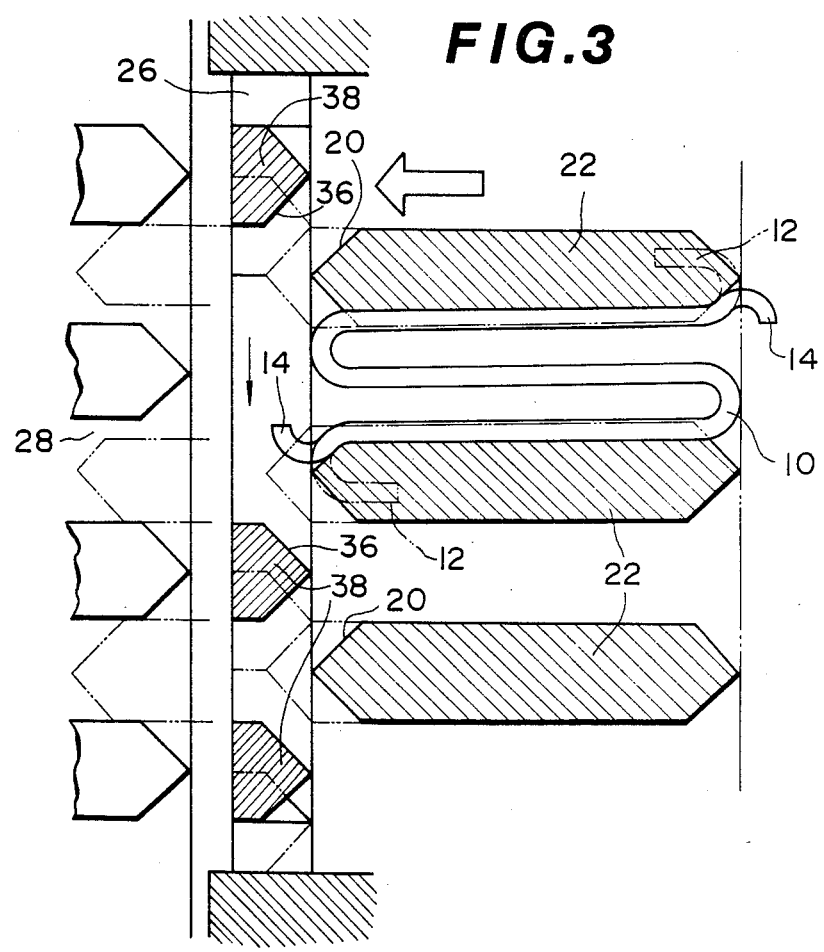
FIG. 3 is a sectional view showing the spring of FIG. 2 disposed in an operational position within a synchronizer.
Figure 2A:
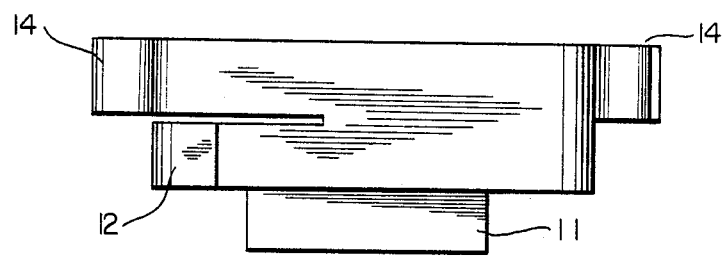
FIG. 2a is a side elevational view of the first embodiment of the spring.
Figure 4:
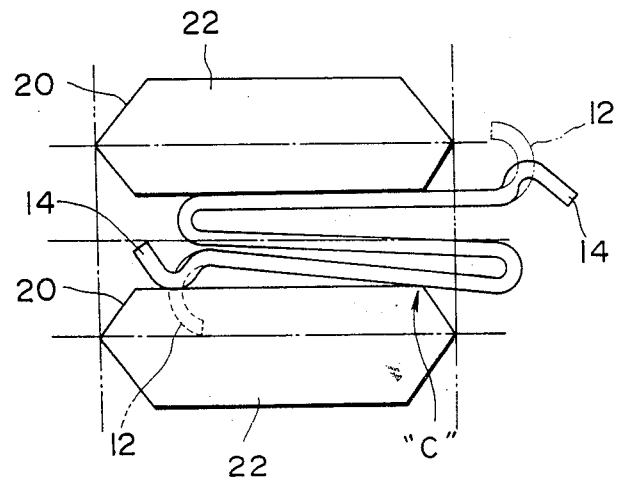
FIG. 4 is a view showing the spring shown in FIG. 2 in a distorted configuration which occurs during engagement of the coupling sleeve with a gear.
Figure 5:
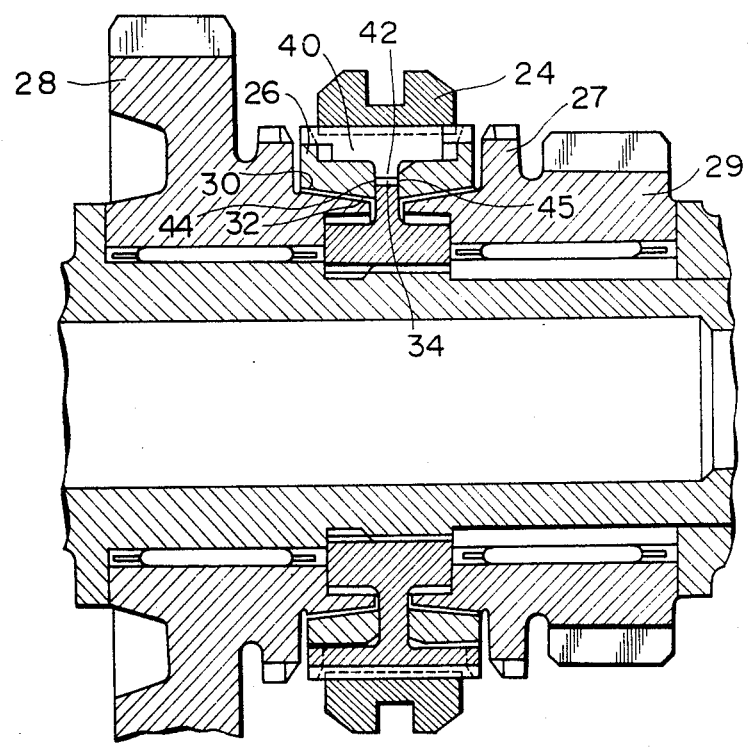
FIG. 5 is a sectional view of a gear and synchronizer arrangement in which a first embodiment of the present invention is employed.

With this arrangement as the coupling sleeve 24 is moved toward a gear (for example 28) the inwardly curving flanges 14 grip the chamfers 20 formed on the coupling sleeve splines 22 and cause each of the springs 10 to move sufficiently toward the same gear (28) to bias the baulk ring 26 in the same direction. This bias induces a first stage of synchronization wherein the frusto-conical surfaces 30, 32 of the gear and the baulk ring engage to the degree of inducing an initial stage of synchronization. Further movement of the coupling sleeve 24 toward the gear 28 induces the situation wherein coupling sleeve splines 22 deflect the inwardly curved portions 14, inwardly as they move therepast to assume a position such as shown in FIG. 4. It should be noted at this time that the axial movement of the spring 10 is limited by the provision of a tang-like member 11 (see FIGS. 2 and 2a) formed at the bottom of the central portion of the spring and which is received in a recess 34 defined between the inboard surfaces 44, 45, of the baulk rings 26, 27, and the notches 16 in the synchro-hub 18 (see FIG. 5 by way of example). Following the deflection of the inwardly curving flange portions 14, the chamfers 20 of the coupling sleeve splines 22 and those 36 formed on the baulk ring teeth 38 engage (as shown in phantom in FIG. 3) after the baulk ring 26 has rotated through a distance which corresponds approximately to half a pitch of the coupling sleeve splining. This engagement applies sufficient force to the frustoconical surfaces 30, 32 to complete the synchronization, whereafter the coupling sleeve 24 pushes the baulk ring 26 aside and moves into engagement with the teeth formed on the gear 28.

Figure 7:
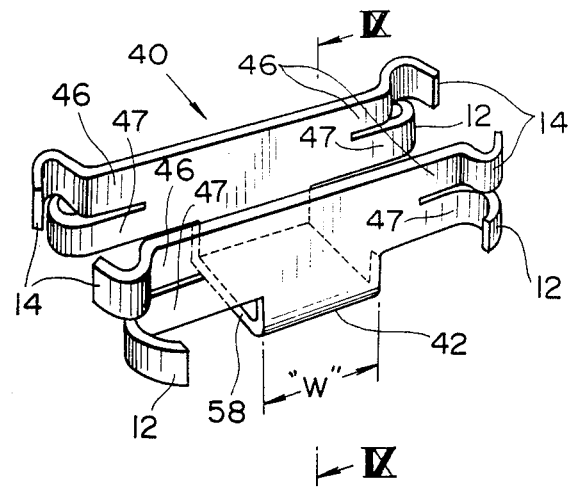
FIG. 7 is an isometric view of a second embodiment of the present invention.
Figure 8:
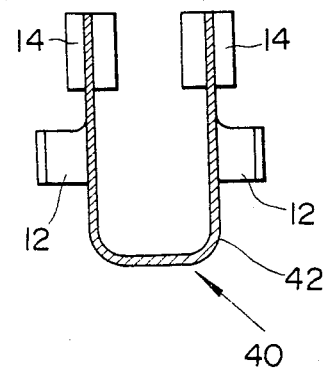
FIG. 8 is a sectional view showing the spring of FIG. 7 disposed within an operational position within the synchronizer.
Figure 9:
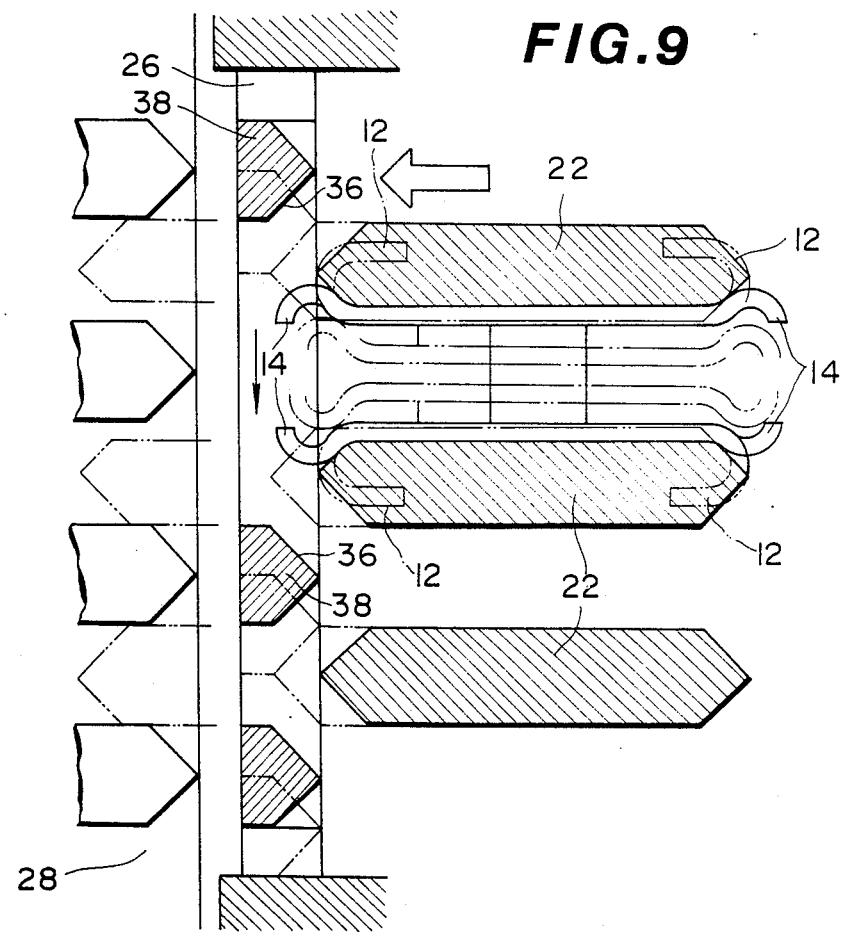
FIG. 9 is a sectional view taken along section line IX—IX of FIG. 7.

FIGS. 7 to 9 show a second embodiment of the present invention. In this arrangement a spring 40 is formed in a manner to have, as best seen in FIGS. 7 and 9, an essentially "U" shaped cross-section (taken laterally across the main body thereof) and pairs of "mirrors image" inwardly and outwardly curved flange 12, 14 at each end thereof so that upon the coupling sleeve 24 deflecting one pair of the inwardly curved flange portions 14, the spring 40 is compressed laterally and assumes a configuration as shown in FIG. 8, wherein the surface contact between the spring 40 and the sides of the coupling sleeve splines 22 is minimized. This feature is deemed advantageous in that the resistance to sliding of the coupling sleeve 24 toward and away from the gear 28 is minimized. This eliminates the problem encountered with the first embodiment wherein as shown in FIG. 4, a line contact tends to be generated at the position indicated by "C" and by which the return of the coupling sleeve 24 toward its home position is somewhat resisted.

In this embodiment the axial length "W" of the tang-like portion 42 is arranged to be essentially equal to the distance defined between the inboard surfaces 44, 45 of the baulk rings 26, 27 which cooperate to define the aformentioned recess 34. As will be readily appreciated from FIG. 7, the tang-like portion 42 of this embodiment is essentially as wide as the main body portion of the spring, and thus able to stably exert force on the inboard surfaces 44, 45 of the baulk rings (viz., a force which acts normally to said surface). Further, as best seen in FIG. 7, in this embodiment the inwardly and outwardly curving flange portions are formed in "mirror image" pairs at the ends of symmetrically arranged finger-like extensions 46, 47, which, via the flexure thereof permit the flange portions 14 to move independently of the portions 12 and enable the bias which the coupling sleeve 24 must be moved against prior to slipping therepast, to be adjusted via selecting the dimensions of the extensions 47.

Figure 10:
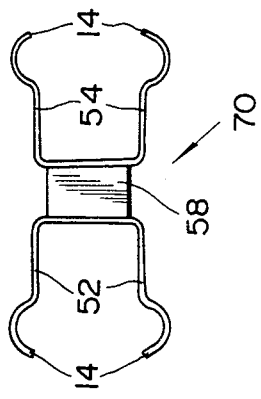
FIGS. 10 and 11 are plan and elevations of a spring constituting a third embodiment of the present invention.
Figure 11:
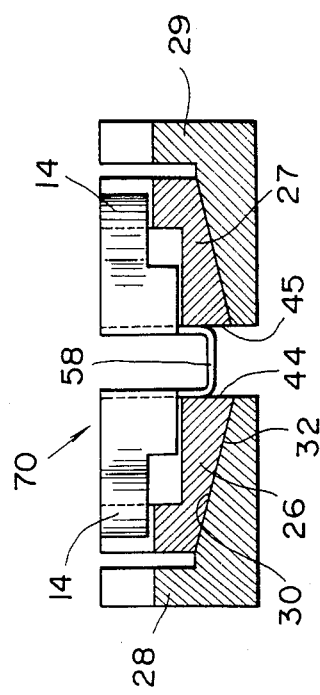

FIGS. 10 and 11, show a third embodiment of the present invention wherein the spring 50 is formed in a manner that as the coupling sleeve 24 slides toward gear 28 and the inwardly curved portions 14 are deflected inwardly between the splines 22 of the coupling sleeve 20 the arm-like extensions 52 on which the inwardly and outwardly curving flange portions are formed, only are deflected inwardly while the extensions 54 remain in contact with the slides of the coupling sleeve splines 22. As shown in FIG. 11, the tang-like portion 56 of this embodiment is arranged so that the bridge portion 58 extends parallel with the axis of rotation of the synchro-hub 18 as different from that of the second embodiment wherein the corresponding portion 60 extends traversely with respect to the same axis. The length of the bridge portion 58 is selected to be "W" which is approximately the same as the distance between the aformentioned inboard surfaces 44, 45.

Figure 12:
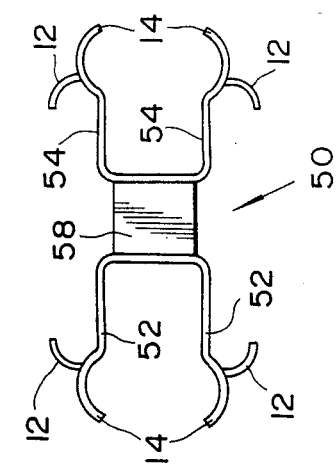
FIGS. 12 and 13 are plan and elevations of a fourth embodiment of the present invention.
Figure 13:
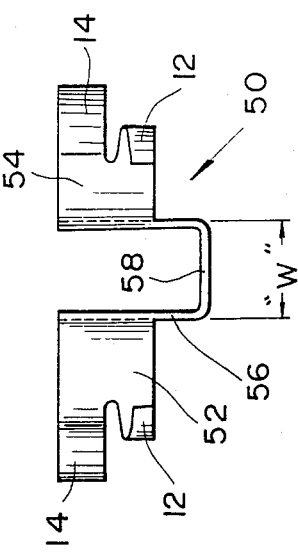

FIGS. 12 and 13 show a fourth embodiment of the present invention which is essentially the same as the previously described arrangement with the exception that the outwardly curving flange portions 12 of the spring 70 are omitted.

With the second and third embodiments disclosed hereinbefore, it will be appreciated that as there are pairs of inwardly curving flanges formed at the ends of the springs, as the coupling sleeve 24 moves toward a baulk ring, the springs will be drawn uniformly therewith (during the initial of the synchronization) further ensuring that force is normally applied to the baulk rings until the coupling sleeve "slips" therepast deflecting the symmetrically arranged positions of the spring on which the flange portions are formed, laterally inwards to obviate any "jamming".

What is claimed is:

1. In a transmission synchronizer
 a synchro hub formed with an aperture;
 a coupling sleeve formed with first splines on an internal surface thereof, said splines having chamfers at each end;
 a baulk ring operatively associated with a transmission gear, said baulk ring being formed with second splines which are engageable with said first splines; and
 a single piece spring disposed in said aperture, said spring comprising:
 first and second side members extending radially with respect to said synchro hub and being flexible toward each other in a direction which is essentially normal to the radius of said synchro hub, said first and second side members being formed with portions which are engageable with the chamfers on the first splines;
 a base member which extends radially inward into said aperture to a level which is radially inferior of said second splines formed on said baulk ring and which is engageable with said baulk ring to bias said baulk ring in an axial direction thereof upon axial movement of said coupling sleeve toward said transmission gear.

2. A manual transmission synchronizer as claimed in claim 1, wherein said spring has an "S" shape and wherein said portions engageable with said baulk ring and said coupling sleeve are formed at each end of said "S" shape.

3. A manual transmission synchronizer as claimed in claim 1, wherein said spring has an essentially "U" shaped cross-section taken laterally across said spring and wherein said portions are formed in pairs at each end of said spring to engage chamfers formed on adjacent splines.

4. A manual transmission as claimed in claim 1, wherein said portions comprise an inwardly curving flange which is engageable with said chamfers.

5. A manual transmission as claimed in claim 4, wherein said portions further comprise an outwardly curving flange portion which engages said baulk ring.

6. In a transmission synchronizer
 a synchro hub formed with an aperture;
 a coupling sleeve formed with first splines on an internal surface thereof, said splines having chamfers at each end;
 a baulk ring operatively associated with a transmission gear, said baulk ring being formed with second splines which are engageable with said first splines; and
 a single piece spring disposed in said aperture, said spring comprising:

first and second side members extending essentially radially with respect to said synchro hub and being flexible toward each other in a direction which is essentially normal to the radius of said synchro hub, said first and second side members being formed with portions which are engageable with the chamfers on the said first splines;

a base member interconnecting a radially inferior edge of each of said first and second members, said base member being arrange in said aperture at a level radially inferior of said second splines formed on said baulk ring and which is engageable with said bulk ring to bias said baulk ring in an axial direction thereof upon axial movement of said coupling sleeve toward said gear.

* * * * *